No. 651,691. Patented June 12, 1900.
M. BARR.
APPARATUS FOR DISPLAYING PHOTOGRAPHS OF MOVING OBJECTS.
(Application filed May 11, 1899.)
(No Model.)
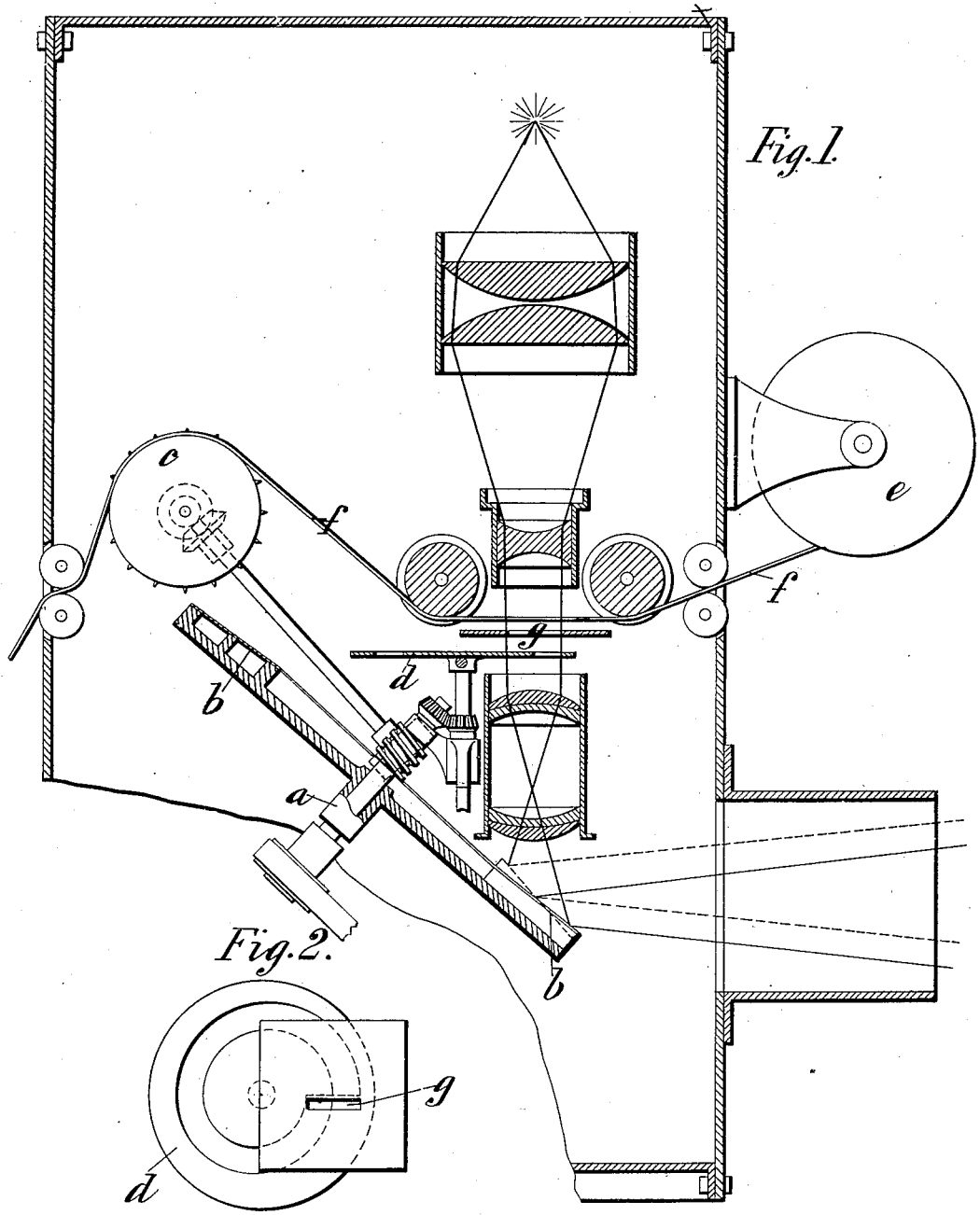

UNITED STATES PATENT OFFICE.

MARK BARR, OF BOWDON, ENGLAND.

APPARATUS FOR DISPLAYING PHOTOGRAPHS OF MOVING OBJECTS.

SPECIFICATION forming part of Letters Patent No. 651,691, dated June 12, 1900.

Application filed May 11, 1899. Serial No. 716,396. (No model.)

*To all whom it may concern:*

Be it known that I, MARK BARR, a citizen of England, residing at "Rosbrin," Bowdon, in the county of Chester, England, have invented certain new and useful Improvements in Apparatus for Displaying Photographs of Moving Objects, of which the following is a specification.

Photographs of moving objects taken as a series of successive pictures on a film are usually displayed by causing the film to move rapidly the length of one picture, then to stop for a fraction of a second, during which the picture is displayed on a screen, to move again, and so on intermittently. The very rapid intermission involves considerable mechanical difficulties and also objectionable vibrations of the images displayed.

My invention relates to apparatus so arranged that there are no intermittent or reciprocating movements, but that while the film travels continuously and uniformly onward the image thrown from it on a screen remains stationary, as I shall describe, referring to the accompanying drawings.

Figure 1 is a vertical section of apparatus according to my invention. Fig. 2 is a diagramatic front view of the revolving screen and a stationary screen.

On an axis $a$, caused to revolve rapidly by any convenient motor—such, for instance, as an electric motor—is fixed an annular mirror $b$, the reflecting-surface of which gradually and uniformly varies in its inclination to the plane of revolution from a point where its inclination is least round the same point where its inclination is greatest and where it suddenly resumes its least inclination. From the axis $a$, by worm or other convenient gear, is driven a pegged roller $c$, by which a film $f$ is drawn from a reel $e$ across an opening $g$ in a screen below the film $f$ and fronted by a screen $d$, which is geared to and revolves uniformly with the mirror $b$. The revolving screen $d$ has through it an opening bounded by two curved lines, which are segments of Archimedean spirals.

A beam of light from any suitable source is directed through the film at the opening $g$ in a stationary screen, through the aperture of the revolving screen $d$, and after passing through lenses $h$ is reflected from the mirror $b$ and directed on a screen. As the film travels while the light passes through it, the spiral form of the aperture of $d$ causes a beam of the light to travel with it, and if this were directed through a projecting-lens onto a screen the image would travel along the screen; but the traveling beam is received on the mirror $b$, the inclination of which is changing as the beam is traveling, and thus the beam is caused to travel in the opposite direction, the effect being that the image on the screen is stationary.

Having now particularly described and ascertained the nature of this invention and the best means I know for carrying the same into practical effect, I claim—

Apparatus for displaying photographs of moving objects comprising means of causing a film having photographs on it to travel uniformly across an opening, a revolving annular mirror having the inclination of its reflecting-surface continuously varying throughout its periphery, a revolving screen having through it a spiral aperture, and a projecting lens or set of lenses, substantially as described.

In testimony whereof I have hereunto set my hand in presence of two subscribing witnesses.

MARK BARR.

Witnesses:
GEO. WM. FOX, Junr.,
WILLIAM H. BURLING.